June 26, 1962 — J. E. BIGELOW — 3,040,983
PULSE-TRAIN RATIO APPARATUS
Filed Aug. 1, 1960
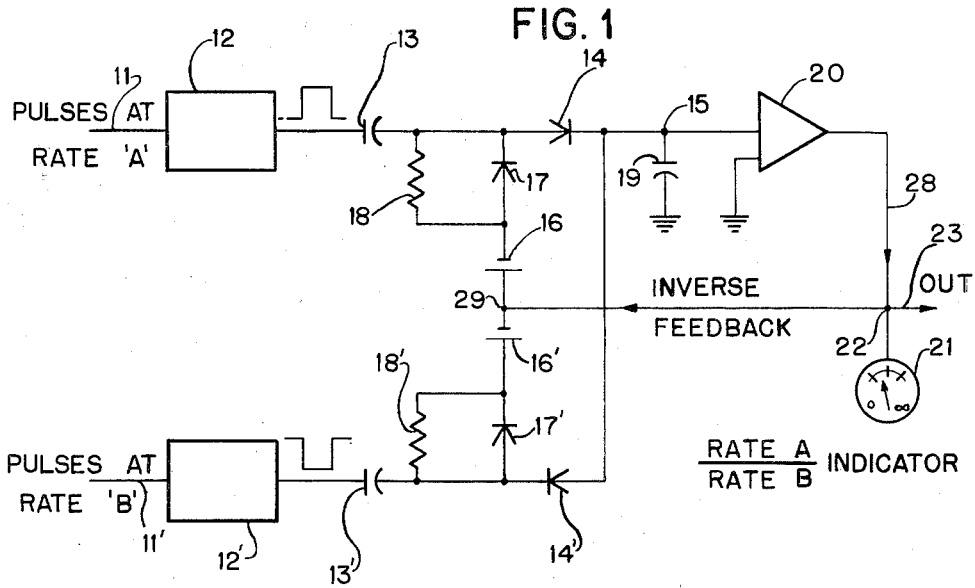
FIG. 1
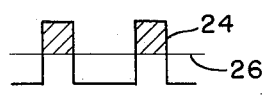
FIG. 2
RATE A = RATE B
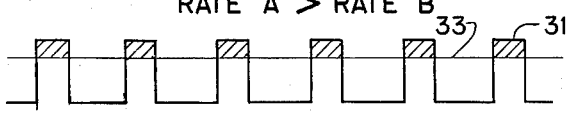
FIG. 3
RATE A > RATE B
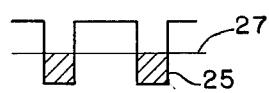
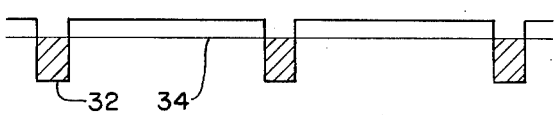
*INVENTOR.*
JOHN EDWARD BIGELOW
BY Irving Keyton
ATTORNEY

United States Patent Office 3,040,983
Patented June 26, 1962

3,040,983
PULSE-TRAIN RATIO APPARATUS
John Edward Bigelow, Milwaukee, Wis., assignor to General Electric Company, a corporation of New York
Filed Aug. 1, 1960, Ser. No. 46,396
12 Claims. (Cl. 235—152)

This invention relates to pulse frequency measuring devices and more particularly to apparatus for computing and indicating the ratio of the pulse rates (or other parameters) of two separate pulse trains, each of which may have a continually or continuously, and irregularly varying pulse rate.

There are myriad applications wherein pulses of energy in the form of sound or light, or electrical impulses, are the means for propagating quantitative and qualitative information. It is often the case that the pulse rate or frequency of the output of the system is the vehicle for carrying the significant information. For example, in various types of radiation analyses wherein proportional or scintillation detectors are utilized in a process for ascertaining chemical content of material e.g. in X-ray spectroscopy or other forms of X-ray analysis, the pulse rate output of the detector is an indication of the presence or absence, and amount, of a particular element or material of interest. In such systems the entire procedure and apparatus may be directed to ascertaining the ratio of one element or material to another element or material, or the analysis of an unknown specimen or sample may be compared to an analysis of a standard specimen or sample. In such circumstances, the information that is desired, namely the ratio of the quantity of one material to the quantity of another material, could be directly ascertained if it were possible to obtain a ratio of the pulse-rate output of one detector, responsive to the first material, to the pulse-rate output of the second detector, responsive to the second material.

In a system of the type described, it is often the case that a continuous flow of material is under examination, the content of which varies with changes in manufacturing processes and controls and as a consequence the output of the two detectors may well be in a constant state of change relative to each other. In such a situation it is of importance that an indication of the pulse-rate ratio be one that is continuously operative and immediately responsive to these variations.

Another area wherein a pulse-rate ratio determining and indicating apparatus is of value comprehends applications wherein a continuously variable pulse frequency dividing circuit is utilized. In such an arrangement it is often desirable to have a simple means for monitoring the output of the frequency divider to ascertain whether the division is being performed accurately and the correct output is being obtained. A pulse-rate ratio device which can indicate directly the ratio of the output of the division circuit relative to the input of the division circuit is of particular value since it can indicate directly the resultant analog quotient computed from two pulse inputs. A device of the type that can provide a direct indication in analog form of the ratio of two pulse-rates is of considerable value in the many forms of pulse train to analog converters used in various input and output devices especially for computing systems.

It is the primary object of this invention therefore to provide a circuit characterized by extreme simplicity for providing a direct analog computation and indication of the ratio of the pulse-rates in two separate pulse trains.

It is an additional object of this invention to provide apparatus which in computing and indicating the ratio of two separate pulse-rates is continuously and immediately responsive to any variation in either or both of the pulse-rates.

In certain practical applications wherein the pulse-rate carries the significant information, it is sometimes the case that variations in the width or amplitude of the pulses, or both, are introduced inadvertently and undesirably and constitute noise in the system. In such systems solely the pulse-rate bears valuable information and all other variations and characteristics of the pulse train are of no information-bearing value and should not be permitted to influence any interpretation of the data borne by the pulse-rate.

It is an additional object of this invention therefore to provide pulse-rate ratio determining and indicating apparatus which is independent in its operation and indication of any parameters of two pulse trains other than their pulse repetition rates.

On the other hand, it is sometimes the case that the pulse amplitudes of the individual pulses in the train carry information of significance in addition to the pulse-rate. It is an additional object of this invention therefore to provide a pulse train ratio determining and indicating device wherein the ratio indication includes information borne by the amplitudes as well as the rates of the pulses.

The above objects are accomplished in accordance with the principles of the invention in a circuit having two inputs receptive of two pulse trains respectively. The two input leads enter two separate channels which eventually combine at one point as an input to a D.C. operational amplifier. Each of the two channels includes circuitry for converting its input pulse train to an analog voltage representation whereby the magnitude of the analog representation is directly proportional to the pulse rate, and the polarity of the analog signal depends upon which pulse train is represented. Thus, during equal intervals of time, the voltage at the junction point input to the amplifier increases if the number of pulses in that given interval increases and conversely the voltage decreases with a decrease in the number of pulses.

The input pulses applied to one of the channels are of a positive sense while those applied to the other channel are of a negative sense. Furthermore, the analog signal generating components in each of the two channels are electrically biased in opposite senses so that the channel handling the positive pulses is biased negatively while the channel receiving negative pulses is biased positively. The biasing level for each of the channels determines what portion of each pulse in each of the channels contributes to the generation of the analog signal at the junction point. It may be seen then that at the junction and input to the D.C. amplifier two analog voltages of opposite polarity are combined, each one of which is directly proportional to the pulse-rate input of its channel. Accordingly, if the input pulse-rates to the two channels are equal, the total analog signal input to the D.C. amplifier is zero. On the other hand, if the pulse-rate of the positive channel, i.e., one wherein positive pulses are applied, is greater than that of the negative channel, i.e., the one to which negative pulses are applied, a net positive analog signal is applied to the amplifier.

It is most important in this arrangement, and one of the major features of the invention, that there is a feedback loop from the output of the D.C. amplifier back to the point wherein the bias is applied to the component performing the pulse to analog signal conversion. Thus, if a net positive input to the D.C. amplifier exists, a negative or inverse feedback signal is obtained from the output of the D.C. amplifier and fed back to the bias generating point. As a consequence of this inverse feedback, the normal bias applied to the two channels is changed in accordance with the magnitude and polarity of the feedback signal. Since the two channels are biased with opposite polarities, the feedback signal will add to one biasing potential and subtract from the other biasing potential. The result of this action is that a smaller portion of the pulses in one channel is converted to the analog-voltage for that channel, while a larger part of each pulse in the pulse train of the other channel is converted into the analog voltage for its channel. In this way the unbalance at the input to the D.C. amplifier is eliminated. Conversely, if the unbalanced input voltage to the amplifier is negative rather than positive, then the inverse feedback from the output of the D.C. amplifier will be of a polarity such that the opposite effect in terms of biasing and generation of the analog voltage will result and a null balanced input to the D.C. amplifier develops when steady state is re-established.

An indicator is located in the feedback loop and provides a direct indication of the ratio of the two input pulse-rates. A zero signal in the feedback loop indicates equal pulse-rates in the two channel inputs and, therefore, a ratio of one. A maximum reading of one polarity in the feedback loop means the pulse-rate in one of the channels is far in excess of that of the other. A maximum reading of the opposite polarity means that the pulse-rate of the other of the two channels is far in excess of the first.

In those embodiments in accordance with the invention wherein it is desired that the output ratio be exclusively determined by the pulse-rate in the two channels and independent of the pulse amplitudes in the pulse trains, then it is of importance to introduce into the input portions of the two channels means for insuring the uniformity of pulse width and pulse amplitude of all of the pulses entering the pulse-rate ratio apparatus. If on the other hand it is desired to have an indication which is dependent not only on pulse rate but also on pulse amplitude, it is desirable to include in the input means a device which permits variation in the pulse amplitude. A ratio indication which is a function of both pulse rate and the pulse amplitude in a given train may provide an indication that is ambiguous for certain purposes. In a case where the ambiguity must be resolved it may be desirable to utilize one pulse-rate ratio device which is restricted exclusively to providing information with respect to the rate ratio, and a second device which provides ratio indication dependent upon both the pulse rate and amplitude. By obtaining both these indications the ambiguity is removed and useful information is isolated with respect to the ratio of pulse rates and also the ratio of pulse amplitudes.

It is a feature of this invention that means are included within the circuit such than an initially balanced input to the D.C. amplifier and therefore a null output therefrom can be arranged to be provided for pulse-rate ratios other than one. Where, for example, the optimum operating condition in some process or analog computational equipment requires a rate ratio other than one-to-one, the circuitry may be adjusted in accordance with the invention such that the desired ratio will provide the initially balanced input to the D.C. amplifier and null output therefrom. In such a situation the meter reading of zero indicates the desired ratio rather than the ratio of one-to-one. In any event, calibration of the rate ratio indicator may be designed in accordance with the particular application in which the invention is used.

The novel features which are believed to be characteristic of my invention are set forth with particularity in the appended claims. My invention itself, however, both as to its organization and method of operation, together with further objects and advantages thereof, may best be understood by reference to the following description taken in connection with the accompanying drawing.

FIG. 1 is an illustrative schematic circuit diagram of an embodiment of a pulse train ratio computer and indicator in accordance with the principles of the invention; and FIG. 2 is a graphic representation of waveforms at certain points in the circuit of FIG. 1 for one mode of operation while FIG. 3 is a graphic representation for a second mode of operation.

The rate ratio apparatus of FIG. 1 comprises two channels "A" and "B" which come to a junction point at the input to a D.C. amplifier; the output of the D.C. amplifier is fed back to a point prior to the junction of the two channels and is used as a control means for changing the D.C. bias applied to the two respective channels. Considering FIG. 1 in greater detail, it will be seen that channel "A," the top channel, is identical to channel "B" except that certain of the components are reversed in polarity. Referring now to channel A, there is an input lead 11 which constitutes an input to multivibrator 12. The multivibrator is of the type such that each time the multivibrator is pulsed, it will produce a positive output pulse. The output lead of multivibrator 12 is in turn coupled to capacitor 13. In series with capacitor 13 is a diode 14 with polarity arranged such that its easy direction of conductivity is exhibited to positive pulses applied thereto.

The circuitry of channel B is similar to that of channel A (with exceptions to be described) and like reference numerals are used to indicate similar components but the reference numerals are primed. It may be noted that the multivibrator 12' of channel B is of the type such that an input pulse thereto results in a negative output pulse therefrom. Furthermore, the diode 14' of channel B is of opposite polarity to that of its counterpart in channel A since it is required that it present its easy direction of conductivity to negative pulses from multivibrator 12' which, of course, provides pulses of opposite polarity to its counterpart in channel A. The output leads of diodes 14 and 14' are connected at point 15 and thus it may be seen that channels A and B are in parallel. Disposed across channels A and B from a point on channel A between capacitor 13 and diode 14 to a point in channel B intermediate capacitor 13' and diode 14' are means for applying biasing signals of opposite polarities to the two channels, respectively. Capacitor 13 is biased negatively by a D.C. source such as battery 16 through a diode 17 and capacitor 13' is biased positively by a D.C. source such as battery 16' through another diode 17' in order to prevent conduction during a pulse from the other side. The bias on capacitor 13 is applied through diode 17 at voltage below ground and the bias on capacitor 13' is impressed through diode 17' at the same magnitude of voltage above ground. Resistors 18 and 18' shunt diodes 17 and 17' respectively. The values of the lumped parameter components in each channel are preferably identically the same as their counterparts in the other channel.

At the channel junction point 15 is disposed a capacitor 19 coupled to ground which constitutes the input of a conventional D.C. amplifier 20. The value of capacitance for capacitor 19 may be different for different applications but in any event is considerably greater than the capacitance of capacitor 13 and 13'. The output of D.C. amplifier 20 is coupled in a feedback loop 28 back to the biasing point for the two channels and in particular is fed back to a point 29 intermediate the D.C. biasing sources 16 and 16'. In this way, the inverse feedback provided by the output of D.C. amplifier 20 contributes to the biasing levels applied in channels A and B to the diodes 14 and 14'. An indicator 21 is coupled to the feedback loop at a junction 22 to indicate the polarity and magnitude of the feedback in the loop. At junction 22 there may also be taken, via terminal 23, a sample of the output of the D.C. amplifier which may be utilized elsewhere for control purposes.

All of the components described in the embodiment of FIGURE 1 are well-known in the art and their details need not be described here. Multivibrators of the type performing the functions required of multivibrator 12 and 12' are amply described in standard texts known in the art, for example, "Pulse and Digital Circuits" by Millman and Taub, McGraw-Hill Book Co., 1956. The D.C.

amplifier 20 is preferably a well drift compensated amplifier. Such operational amplifiers are also well-known in the art and are described in standard works, for example, "Electronic Analog Computers" by Korn and Korn, McGraw-Hill Book Company, second edition, or "Industrial Electronics Handbook," by Cockrell, Section 4b, McGraw-Hill, 1958.

The operation of the rate ratio apparatus of FIGURE 1 may now be comprehended. At the outset it should be understood that the inputs to leads 11 and 11' as disclosed are in the form of electrical pulses. In their inception, however, they may have been acoustical pulses or light pulses which, when fed through appropriate transducers, provide electrical signals that may then be applied to the input leads 11 and 11'. If the pulse trains applied to the leads 11 and 11' comprise pulses which are uniform with respect to width, amplitude and shape, then the multivibrators 12 and 12' may be dispensed with. All that would be needed would be a pulse inverting device for one of the two channels. Where, however, the input pulses are irregular in amplitude and width, it is desirable to include the multivibrators 12 and 12' such that irrespective of the type of pulse applied to the multivibrator a uniform output pulse is generated. At the output of multivibrators 12 and 12' therefore, there appears a pulse train from each having a pulse rate precisely the same as the pulse rate of the trains at the inputs to the multivibrators. The output pulses of multivibrator 12' are of negative polarity and therefore inverted with respect to the positive pulse train appearing at the output of multivibrator 12 in channel A. As these pulses are applied to their respective capacitors 13 and 13', the capacitors charge and discharge through their respective diodes 14 and 17, on the one hand, and 14' and 17' on the other hand, so that positive charge is passed from channel A to capacitor 19 at the junction point 15 while negative charge is passed to capacitor 19 from channel B. In this way the net charge passed by both channels and stored in capacitor 19 is determined by the difference in the pulse-rates of the input pulse trains.

To understand this latter point more clearly, reference may be had to FIGURE 2. It may be noted that the pulse train 24 corresponds to a positive pulse train in channel A. The horizontal reference line 26 represents the biasing level provided by D.C. source 16. Therefore, the charge transferred through diode 16 to capacitor 19 is provided exclusively by that portion of the pulse above the reference line 26 (indicated by the diagonally lined area of the pulse). The bias level 26 as indicated previously is determined by the biasing circuit comprising D.C. source 16, diode 17 and resistor 18. A change in the bias level 26, effectively changes the amount of charge transferred to capacitor 19 as capacitor 13 charges and discharges. In similar fashion, the negative pulse train 25 shown in FIGURE 2 contributes negative charge to capacitor 19 only for those portions below the bias level 27 (also indicated by the diagonally lined pulse areas). As shown in FIGURE 2 and mentioned in the discussion above, the bias levels 26 and 27 are of equal magnitude but opposite polarity.

Let us assume that the pulse rate in channel A is equal to the pulse rate in channel B as shown in FIGURE 2. Since the pulse rates are equal and the bias levels are equal in both channels, and since the pulses are of opposite polarity, the net charge built up across capacitor 19 at the junction 15 of the two channels A and B is zero. As a consequence, there is zero input to the D.C. amplifier and no signal in the feedback loop 28 at all. Thus a steady state condition exists wherein there is a zero indication on the volt meter 21. This zero indication means therefore, that the ratio of the rate of the input pulses in channel A to the rate of the input pulses in channel B is equal to one, i.e., the pulse rates are the same in the two channels.

Let us consider a second condition where, for example, the rate of the pulses applied to channel A is greater than the pulse rate in channel B. Such a situation is graphically represented in FIGURE 3 wherein the pulse train 31 of channel A has twice as many pulses for a given interval of time as the pulse train 32 of channel B. This being the case, the charge transferred to the capacitor 19 by channel A is twice as great as that transferred to the capacitor by channel B in any given time interval. As a consequence, a net positive charge is applied to the capacitor 19 and thus a positive voltage is introduced as an input signal to the D.C. amplifier. The D.C. amplifier, therefore, now has an output voltage and it is of opposite polarity to its input, i.e., the positive input signal to the D.C. amplifier results in a negative voltage in the feedback loop. This negative voltage is applied to the biasing circuit between channels A and B at point 29. The negative voltage, it may be noted, serves to further increase the negative bias applied to channel A while concomitantly and simultaneously decreasing the positive bias applied to channel B. This may be more readily visualized by reference to FIGURE 3. The effect of the negative feedback signal on the biasing level of channel A is reflected in the position of line 33. This level has been raised from its counterpart 26 of FIGURE 2, and as a consequence, a smaller part of each pulse now contributes to charging capacitor 19 than was the case in FIGURE 2 for channel A. At the same time, the effect of the negative feedback signal on channel B may be seen by reference to the bias level line 34. It may be seen that the biasing level has been reduced in magnitude such that a greater part of each pulse of the pulse train 32 contributes to providing the charge applied by channel B to capacitor 19. In fact, the arrangement is such that that portion of each of the pulses of train 32 (channel B) is twice the magnitude of that portion of each pulse of train 31 (channel A) contributing to the charge on capacitor 19. Effectively then, the pulse train of channel A has twice the rate of that of channel B but only half the effective signal for each pulse.

In this way, the inverse feedback provided from the D.C. amplifier tends to provide a balanced or null input to the D.C. amplifier after steady state conditions obtain. Now, however, the feedback voltage meter 21 does not have a zero reading but a steady negative voltage reading which voltage is exclusively that required to provide the appropriate unbalance in the biasing levels of the two channels. Furthermore, this voltage is directly proportional to the ratio of the pulse rate of the train applied to channel A, on the one hand, to the pulse rate applied to channel B, on the other hand.

The function of the resistors 18 and 18' in shunt with the diode 17 and 17' may now be seen. With a very high pulse rate in one channel and a small or zero pulse rate in the other channel the diode 14 or 14', as the case may be, would be biased, by large values of biasing signal, far into the back direction and thus the voltage at the point intermediate the capacitor 13 and diode 14 or intermediate 13' and 14', as the case may be, would be indeterminate in the absence of the resistor 18 or 18'.

As described, FIGURE 1 provides a zero signal in feedback loop 28 (and thus no feedback contribution to the bias level in the two channels) only when the input pulse rates are equal (the meter 21 is calibrated accordingly). Where, however, it is desired that an initially balanced input to the amplifier 20 be provided for input pulse-rate ratios other than one, a simple modification in the circuit of FIGURE 1 readily satisfies the new requirement. Assume, for example, that an actual input pulse rate ratio of 2:1 is optimum in some application or process and it is for such a ratio that a null indication in the feedback loop is required. This is readily accomplished by choosing the values of capacitance of capacitors 13 and 13' to have a ratio of 2:1 (rather than being equal as previously described). With the capacitances so selected, the channel to which is applied the higher pulse rate transfers to junction 15 only half of the charge that the other channel would transfer if it were supporting the higher rate. In this way charge of equal magnitude and opposite polarities is initially applied to junction 15 from the two channels even though the pulse rate applied to one channel is twice that applied to the other. In lieu of (or in conjunction with) the differences in capacitors 13 and 13', making unequal the biasing levels supplied (by batteries 16 and 16') to the channels provides the same result as does making unequal the pulse amplitudes (by multivibrators 12 and 12'). By controlling any one or all of these parameters, any pulse-rate ratio may be selected and set up as the reference, i.e., to give a zero feedback signal.

The same arrangement disclosed in FIGURE 1 may be utilized to compute and provide a ratio indication which is the function not only of the pulse rates, but also the pulse amplitudes of the trains applied to the channels. Such an arrangement may readily be accomplished by substituting pulse amplifiers for the multivibrators 12 and 12'. In order to insure the reversal of polarity of the input pulses to channel B, a pulse inverter may be inserted at that point of channel B between the pulse amplifier and capacitor 13'. In certain practical applications of the ratio apparatus of FIGURE 1, the pulse train that is applied to channel B would by the normal generation of the pulse train have a polarity opposite to that of channel A. In such a case, of course, the pulse inverter need not be used in channel B.

The indication on indicator 21 in this modification of FIGURE 1 is a function not only of pulse rate, discussed above, but also of pulse amplitude. As such, there is a fusion of two type of information which for certain applications is ambiguous. To remove the ambiguity, and isolate each item of information, the indication of this modified circuit may be taken in conjunction, and compared, with the indication that is obtained from the unmodified circuit of FIGURE 1. In this way, an indication may be provided by one circuit which is exclusively a rate ratio and completely independent of pulse amplitude, while the second indication is the combined indication based upon pulse rate and pulse amplitude.

While I have described and shown the particular embodiments of my invention, it will be understood that many modifications may be made without departing from the spirit thereof, and I contemplate by the appended claims to cover any such modifications as fall within the true spirit and scope of my invention.

What I claim is:

1. Apparatus for providing an analog signal commensurate with the ratio of the pulse rates of two pulse trains comprising: first and second transmission channels the terminal ends of which meet at means for combining the outputs of said channels; input means coupled to said first and second channels for applying first and second pulse trains to the inputs of said first and second channels, respectively; first and second transfer means in said first and second channels respectively for transferring a portion of the energy in each pulse in said first and second trains respectively to said combining means; control means coupled to said first and second transfer means for fixing the magnitude of the portion of each pulse in each of said channels transmitted to said combining means and feedback means coupled from said combining means to said control means responsive to the magnitude of energy from said combining means for varying the magnitude of said portion of each pulse transmitted to said combining means as a function of said magnitude of energy from said combining means.

2. Apparatus as recited in claim 1 wherein the ratio of a parameter value of said first transfer means to the value of the same parameter of said second transfer means is the same as the ratio of the pulse rates of said first and second pulse trains transmitted by said first and second channels when the magnitude of the signal in said feedback means is zero.

3. Apparatus as recited in claim 1 wherein said input means includes means for maintaining the polarity of said second pulse train opposite to the polarity of said first pulse train.

4. Apparatus as recited in claim 1 wherein said first and second transfer means include energy storage means.

5. Pulse train ratio computing and indicating means comprising: first and second transmission channels terminating at a common junction; said first and second channels each including a capacitor and a diode in series with unlike electrodes of said diodes connected at said junction; bias means coupled to said diodes for biasing said diodes in opposite senses; a capacitor coupled to said junction; a D.C. amplifier taking its input from said capacitor coupled to said junction; and feedback means coupling the output of said amplifier to said bias means for varying the bias levels applied to said diodes.

6. Computing means as recited in claim 5 wherein said amplifier provides a signal output of polarity opposite to its input.

7. Computing means as recited in claim 5 wherein each of said diodes is coupled to said bias means through another diode in shunt with a resistor.

8. Computing means as recited in claim 5 including first means for applying a train of pulses having a given polarity to the input of said first channel and second means for applying a train of pulses having polarity opposite from said given polarity to the input of said second channel.

9. Computing means as recited in claim 5 including first means for applying a train of pulses having uniform width and amplitude and given polarity to said first channel and second means for applying a train of pulses having uniform width and amplitude and polarity opposite to said given polarity to said second channel.

10. Computing and indicating means as recited in claim 5 including an indicator coupled to said feedback means responsive to the magnitude and polarity of the signal in said feedback means.

11. Computing means as recited in claim 5 including means for preventing the pulses propagating in said first and second channels from transferring between said channels.

12. Computing means as recited in claim 5 wherein the ratio of the values of capacitance of said capacitor in said first and second channels is the same as the ratio of pulse rates applied to said first and second channels that results in a zero signal in said feedback means.

References Cited in the file of this patent

UNITED STATES PATENTS

| 2,457,676 | Holmes | Dec. 28, 1948 |
| 2,755,441 | Gulnac | July 17, 1956 |
| 2,957,135 | Gray | Oct. 18, 1960 |